3,032,637
SOLDERING HANDPIECE
Henry G. Wasserlein, Joliet, Ill., assignor to American Electrical Heater Company, Detroit, Mich., a corporation of Michigan
Filed Aug. 14, 1958, Ser. No. 754,999
8 Claims. (Cl. 219—26)

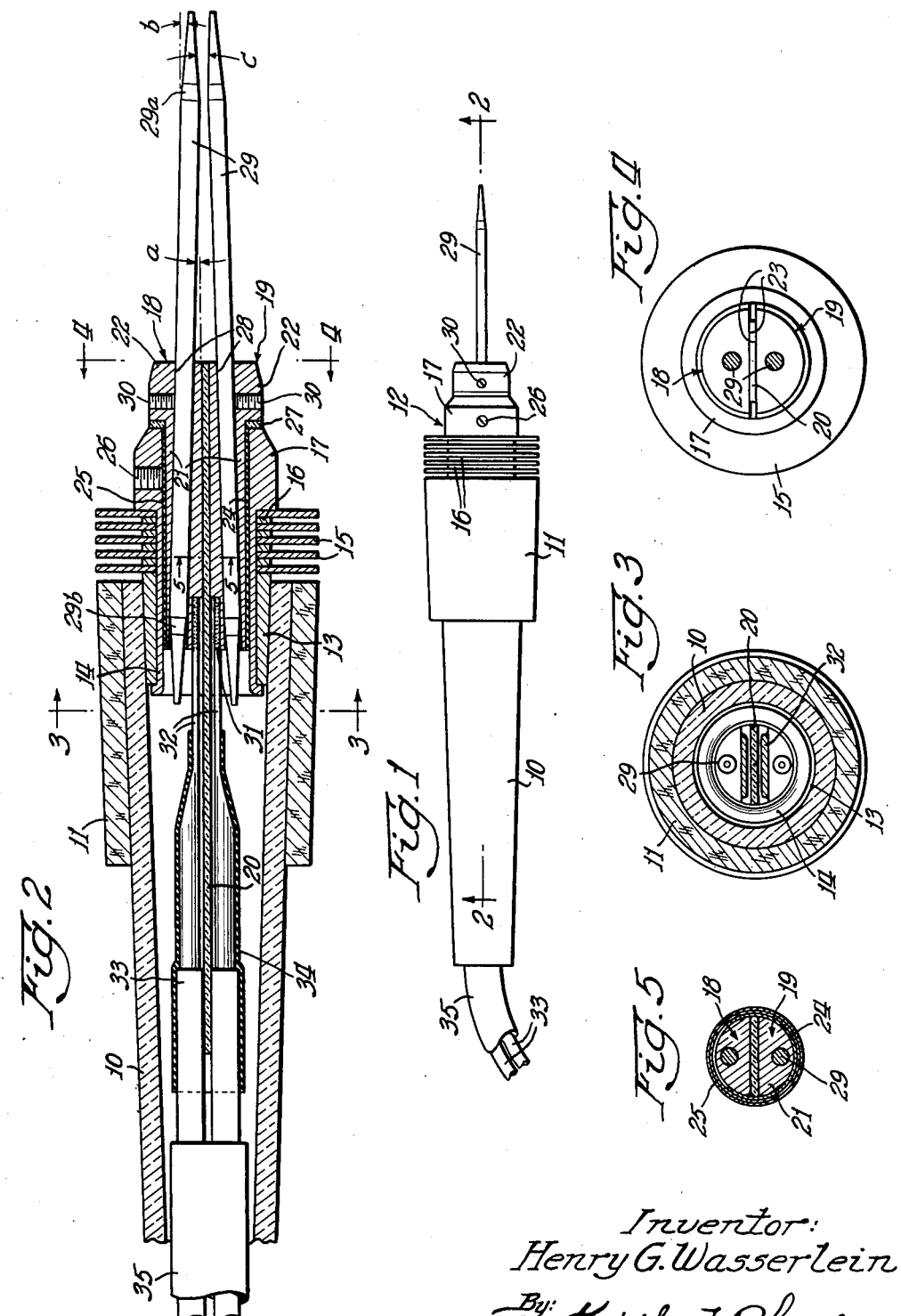

My invention relates to soldering devices and more particularly to handpieces using the principles of resistance soldering.

Resistance soldering devices having a single electrode, usually carbon, carried by a handpiece have in the past been quite generally used. A low voltage, high current source of electricity, such as the secondary of a step-down transformer, has been connected to the electrode and also by means of a ground connection to the workpiece to be soldered, resulting in the passage of high current through the workpiece and the heating of the workpiece to soldering temperature.

It is an object of the present invention to provide an improved electrode holding device and more specifically a handpiece using resistance soldering methods which holds two electrodes instead of only one, obviating the need of a ground connection.

It is a more specific object of the invention to provide such an improved resistance soldering handpiece in which the electrodes are formed from a resilient metal wire whereby the electrodes may be slipped over the workpiece against the resilience of the electrodes to provide a good electrical circuit. More specifically, it is an object to have the electrodes extend from the handpiece at an included angle so that the electrode tips may be moved together or farther apart simply by moving them in or out of the handpiece. It is also an object to taper the electrodes on their ends to form an included angle, so that the electrodes may be easily slipped over the workpiece.

It is also an object to make the electrodes out of relatively high resistance material and to coat the metal wire with a low resistance sheath so that the high resistance material only is in contact with the workpiece due to the taper on the ends of the electrodes whereby the electrodes heat substantially only on their end portions which are in contact with the work.

The invention consists of the novel constructions, arrangements and devices to be hereinafter described and claimed for carrying out the above stated objects, and such other objects as will be apparent from the following description of a certain preferred embodiment of the invention, illustrated with reference to the accompanying drawing, wherein:

FIG. 1 is a side view of a soldering handpiece embodying the principles of the invention;

FIG. 2 is a longitudinal sectional view on an enlarged scale of the handpiece taken on line 2—2 of FIG. 1;

FIGS. 3 and 4 are sectional views taken respectively on lines 3—3 and 4—4 of FIG. 2; and FIG. 5 is a partial sectional view taken on line 5—5 of FIG. 2.

Like characters of reference indicate like parts in the several views.

Referring now to the drawing, the illustrated soldering handpiece may be seen to comprise a tubular plastic handle 10 having a tubular cork grip 11 positioned on its forward end and fixed thereto by means of a suitable adhesive. A finned heat dissipating assembly 12 is fixed by means of a suitable adhesive within the forward end of the handle 10 and comprises a ferrule 13, a shank 14, large diameter washers 15 and small diameter washers 16. The shank 14 is provided with an enlarged head 17, and the washers 15 and 16 are stacked alternately on the shank against the enlarged head 17. The ferrule is disposed on the stacked washers 15 and 16, and the end of the shank 14 is staked over the ferrule 13 to hold the washers 15 and 16 firmly between the ferrule 13 and the head 17 of the shank 14. The ferrule 13 fits within the tubular handle 10 and is fixed therein by adhesive. The ferrule 13, the shank 14 and the washers 15 and 16 may all be of aluminum for efficiently conducting and dissipating heat.

A pair of adaptors 18 and 19 separated by a strip of insulating sheet 20 are positioned within the assembly 12. The adaptors may be of nickel plated brass for good electrical conductivity, and the sheet 20 may be of silicone glass laminate. Each of the adaptors is formed with a substantially half round shank portion 21 and a substantially half round enlarged head portion 22, and the two adaptors may be formed from a single piece of rod of proper diameters having a slot milled longitudinally therethrough for receiving the strip 20 and forming flat surfaces 23. A piece of insulating sheet 24 which may be varnished fiber glass tape is wrapped around the shank portion 21 of the adaptor 19, and both adaptors have their shank portions 21 wrapped with two turns of cellophane tape 25 which covers the sheet 24. The assembly of the adaptors 18 and 19 and insulating sheet 20 is positioned within the shank 14 and is held fixed therein by means of a set screw 26 positioned over the adaptor 18. An insulating washer 27 of silicone glass laminate, for example, is provided between the forward end of the shank head 17 and the adaptor head portion 22.

Each of the adaptors 18 and 19 is provided with a longitudinally extending hole 28 extending therethrough. The hole is at a certain small angle $a$ with respect to the flat internal surface 23 of the adaptor. The angle $a$ is 1½ degrees in a preferred form of the invention. Wire electrodes 29 extend through the holes 28 forwardly of the handpiece a considerable distance so that their tips approach each other, but are spaced by a gap, due to the existence of the angle $a$ in each of the adaptors. The electrodes are of suitable material and thickness so as to be somewhat flexible, and the material of the electrodes has a substantial resistivity for purposes to be described. The electrodes may, for example, be of stainless steel wire .062 inch in diameter. The electrodes are also preferably copper plated, which may be on the order of .005 inch thick. Each of the electrodes is sharpened or tapered on its ends to a small angle $b$, which may be 4 degrees, for example. The angles $a$ and $b$ are chosen so that there is a small included angle $c$, such as 5 degrees, between the electrodes at their ends. Due to the sharpening, the electrodes have the copper plating terminating a short distance from their ends, at 29$a$ and 29$b$. Each of the electrodes is held fixed in one of the adaptors 18 and 19 by means of a set screw 30 extending through the adaptor.

Each of the adaptors 18 and 19 is formed with an inner shoulder 31, and braided copper leads 32, after being first flattened under pressure, are soldered on to these shoulders. Insulating sheath 33 is provided about the leads 32, and plastic electrician's tape 34 is wrapped around the sheath 33, the bare portions of the leads 32, and the insulating strip 20, as shown in the drawing. A single insulating sheath 35 is provided about the sheaths 33 to form a cable which extends rearwardly through the handle 10.

In use, the handpiece is grasped in the hand and is brought toward the work with the forward tips of the electrodes 29 foremost. The work may be a lug or the like to which a member, such as a wire, is to be soldered. The cork grip 11 in particular is intended to be grasped by the forefingers and provides a cool, comfortable manner for holding the tool. The electrodes 29 are lightly forced over the lug or other work to embrace it, with the work bearing on the conical ends of the electrodes between the points 29a and the extreme ends of the electrodes so that the electrodes on their ends are forced apart slightly against their spring action. This results in an excellent electrical contact between the electrodes and the work. The leads 32 are connected to a low voltage high current source of electricity, such, for example, one to seven volts and ten to three hundred amperes, as from a stepdown transformer (not shown), and the current flows through the leads 32, the adaptors 18 and 19, the electrodes 29 and the work to heat up the work to soldering temperature. The heating is due to two factors. First, it is due to the fact that the electrodes have a high resistance, particularly on their tapered ends, being made of stainless steel. The current flows principally through the copper plating toward the forward tapered ends of the electrodes 29 to the points 29a where the copper sheath ends, and thence flows through the forward portions of the tapered ends which are solid stainless steel, since the copper sheath has been cut from the electrodes beyond the points 29a in tapering the electrodes. The current in flowing through the solid stainless steel tips of the electrodes heats the electrodes at their tips and this heat is imparted to the work by conduction. Second, the work is generally heated also by the flow of current through the joint being soldered, due to the electrical resistance of the parts. The solder and flux are then applied to the work; the solder melts, and the soldering tool is removed, leaving a soldered joint.

Heat is only developed at the conical tips of the electrodes 29 and only when the tool is actually being used, so there is not much tendency for the tool to become hot to the user. However, for the little heat that does develop in the tool due to continued use, the finned heat dissipating assembly 12 is effective. The large washers 15 provide a large air-metal surface forwardly of the cork grip so that the heat is dissipated before reaching the operator held part of the tool.

In forcing the forward tips of the electrodes apart against the inherent springiness of the electrodes by using the taper on the electrode tips, the operator assures a good contact with the work. In order to adapt the tool for different sizes of work, the electrodes 29 may be moved farther into the adaptors 18 and 19 so that the conical electrode tips are farther apart, or the electrodes may be moved farther out of the adaptors so as to move the electrode tips closer together. This action is due to the fact that the holes 28 are formed at the angle a to the flat surfaces 23 and therefore to the longitudinal axis of the tool. The set screws 30 are of course loosened and subsequently tightened in order to allow this movement of the electrodes. Both ends of the electrodes 29 are preferably sharpened to form conical tips, as shown in the drawing. Both ends may thus be used in soldering—the electrodes may simply be reversed in order to use the inner tips. The electrodes may also of course be reground to reform the taper on the tips whenever due to use it is necessary.

The illustrated dual tip handpiece provides both electrical connections to the work, and no conventional ground connection is thus required. There thus is no necessity for passing current through the electrical component to which the lug or other work being soldered is connected, bearing in mind that the electrical component very possibly might not have the capability of taking the large soldering current from a ground connection without harm and probably in addition would prevent a satisfactory soldered joint due to the inherent resistance of the component. Due to the provision of the insulating tape 24 around the adaptor 19, in the event that the set screw 26 pierces the insulation underneath it, at most it will ground only the one adaptor 18 to the assembly 12 and will not cause a short circuit between the adaptors 18 and 19. The handpiece is inherently light in weight and is well balanced and may be easily held.

I wish it to be understood that the invention is not to be limited to the specific constructions and arrangements illustrated and described, except only insofar as the claims may be so limited, as it will be understood to those skilled in the art that changes may be made without departing from the principles of the invention.

I claim:

1. In an electrical soldering device, a pair of electrodes adapted to be connected to an electrical current source, a tubelike body insulating said electrodes with respect to each other and holding them in spaced relation, said electrodes each being in the form of a wire of a resilient material and said body being formed with openings therethrough receiving said electrodes and which extend generally longitudinally of said body and at an included angle with respect to each other so that said electrodes approach each other at their ends, means for releasably fixing said electrodes in said openings so that the electrodes may be longitudinally moved therein to bring them closer or farther apart at their ends, said electrodes having end parts remote from said body which have high resistance relative to the rest of the electrodes and which are tapered from their extreme ends remote from said body to form an included angle between the end parts opening outwardly in a direction away from said body whereby a workpiece to be soldered may be forced between the electrode end parts forcing the electrodes apart against their resilience to complete an electric circuit through the electrodes and through the workpiece for heating the latter to a soldering temperature.

2. In an electrical soldering device, a pair of electrodes adapted to be connected to an electrical current source, and a body insulating said electrodes with respect to each other and holding them in spaced relation, said electrodes each being in the form of a wire having a relatively high resistance core and a relatively low resistance sheath, said electrodes being tapered to expose said cores on the ends of the electrodes to form an included angle between the electrodes whereby a workpiece to be soldered may be positioned between them in said included angle in contact with said cores and not with said sheaths to complete an electric circuit through the electrodes and a part of the core of each electrode to the exclusion of the sheath thereof and through the workpiece so that the current flowing through said core parts causes heating thereof and of the workpiece in contact therewith.

3. In an electrical soldering device, a pair of electrodes adapted to be connected to an electrical current source, and a body insulating said electrodes with respect to each other and holding them in spaced relation, said electrodes being formed of stainless steel wire having a copper plating, said electrodes being tapered on their ends to form an included angle between them to expose the stainless steel on their ends whereby a workpiece to be soldered may be positioned between them in said included angle in contact with the stainless steel and not with the copper plate of the electrodes to complete an electric circuit through the electrodes and the stainless steel thereof at the ends of the electrodes and through the workpiece so that the current flowing through the electrodes causes heating thereof at their ends and of the workpiece in contact therewith.

4. In an electrical soldering device, a pair of electrodes adapted to be connected to a electrical current source, and a body insulating said electrodes with respect to each other and holding them in spaced relation, said electrodes each being formed of a wire which is resilient and has a relatively high electrical resistance and which is plated with a material having a relatively low electrical resistance, said electrodes being tapered on their ends to form an included angle and to expose the wire to the exclusion of its plating whereby a workpiece to be soldered may be forced between said electrodes into said angle to move them apart against their resilience and in contact with the relatively high resistance wire to complete an electric circuit through the workpiece and the electrodes and parts at the electrode ends to the exclusion of the plating so that the current flowing through the electrodes causes heating thereof at their ends and of the workpiece in contact therewith.

5. In an electrical soldering device, a pair of electrodes adapted to embrace a workpiece for heating the latter to soldering temperature on the passage of current through the electrodes and workpiece, a pair of adaptor members of electrical conducting material each receiving one of said electrodes and each constituting substantially half of a tube, an insulating sheet between said adaptor members, a tubular handle, a shank surrounding said adaptor members and holding them in tube form, a ferrule fitting within said handle and fitting over said shank, and a plurality of heat conducting fins fitting on said shank whereby the shank and the ferrule and the fins constitute a heat dissipating assembly.

6. In an electrical soldering device, a pair of electrodes adapted to be connected to an electrical current source, and a body insulating said electrodes with respect to each other and holding them extending along each other in spaced relation, said electrodes each comprising a low resistance part extending into said body and a high resistance end part remote from said body, said end electrode parts being tapered from their extreme ends remote from said body to form an included angle between the end electrode parts opening outwardly in a direction away from said body whereby a workpiece to be soldered may be positioned between them in said included angle to complete an electric circuit through the electrodes and through the workpiece for heating the latter to a soldering temperature.

7. In an electrical soldering device, a pair of electrodes adapted to be connected to an electrical current source, and a body insulating said electrodes with respect to each other and holding them extending along each other in spaced relation, said electrodes each being resilient and rod-like in shape and having a low resistance part extending into said body and a high resistance end part remote from said body, said end electrode parts being tapered from their extreme ends remote from said body to form an included angle between them opening outwardly in a direction away from said body whereby a workpiece to be soldered may be positioned between the end electrode parts in said included angle forcing the electrodes apart against their resilience to complete an electric circuit through the electrodes and through the workpiece for heating the latter to a soldering temperature.

8. In an electrical soldering device, a pair of electrodes adapted to embrace a workpiece for heating the latter to soldering temperature on the passage of current through the electrodes and workpiece, a pair of adaptor members of electrical conducting material each receiving one of said electrodes and each constituting substantially half of a tube, an insulating sheet between said adaptor members, a tubular handle, a shank surrounding said adaptor members and holding them in tube form, a ferrule fitting within said handle and fitting over said shank, and a plurality of heat conducting fin forming washers of relatively large diameter spaced by a plurality of relatively small diameter washers fitting on said shank whereby the shank and the ferrule and the fin forming washers constitute a heat dissipating assembly.

References Cited in the file of this patent

UNITED STATES PATENTS

| | | |
|---|---|---|
| 449,258 | Robinson | Mar. 31, 1891 |
| 1,869,448 | Woodring | Aug. 2, 1932 |
| 2,221,646 | McPherson | Nov. 12, 1940 |
| 2,449,521 | Warner | Sept. 14, 1948 |
| 2,504,338 | MacLatchie | Apr. 18, 1950 |
| 2,550,090 | Schnepp | Apr. 24, 1951 |
| 2,552,253 | Brown | May 8, 1951 |
| 2,677,039 | Clark | Apr. 27, 1954 |
| 2,708,706 | Stark | May 17, 1955 |
| 2,790,059 | Burnett | Apr. 23, 1957 |

FOREIGN PATENTS

| | | |
|---|---|---|
| 551,338 | Great Britain | Apr. 5, 1943 |
| 556,835 | Great Britain | Oct. 25, 1943 |